United States Patent [19]

Donner

[11] Patent Number: 5,313,985

[45] Date of Patent: May 24, 1994

[54] MODULAR VALVE ASSEMBLY

[75] Inventor: Richard A. Donner, Hanover Park, Ill.

[73] Assignee: Eaton Corporation, Cleveland, Ohio

[21] Appl. No.: 115,726

[22] Filed: Sep. 2, 1993

Related U.S. Application Data

[62] Division of Ser. No. 938,191, Aug. 31, 1992, abandoned.

[51] Int. Cl.$^5$ .................................... F16K 43/00
[52] U.S. Cl. .................................... 137/884; 137/597; 137/15
[58] Field of Search ................ 137/597, 884, 15

[56] References Cited

U.S. PATENT DOCUMENTS

| | | | |
|---|---|---|---|
| 2,209,024 | 7/1940 | Jones | 137/597 |
| 2,905,386 | 9/1959 | Rimsha et al. | 137/597 X |
| 4,270,570 | 6/1981 | Kolze | 137/597 |
| 4,444,215 | 4/1984 | Zukausky | 137/597 X |
| 4,844,112 | 7/1989 | Pick et al. | 137/15 |
| 4,913,183 | 4/1990 | Vogel et al. | 137/15 |
| 5,172,713 | 12/1992 | Hall | 137/15 |

*Primary Examiner*—John C. Fox
*Attorney, Agent, or Firm*—R. A. Johnston

[57] ABSTRACT

A valve assembly having a plurality of solenoid operated valving operators, each attached by non-metallic weldment to a manifold having a plurality of outlets. Two of the operators are adapted for connection to separate fluid sources such as hot and cold water and individually valved flow to a common mixing outlet on the manifold and also supply unvalved flow to an auxiliary passage in the manifold. Others of the valving operators are connected to receive flow from the auxiliary passage and provide valved flow individually to others of the outlets.

7 Claims, 4 Drawing Sheets

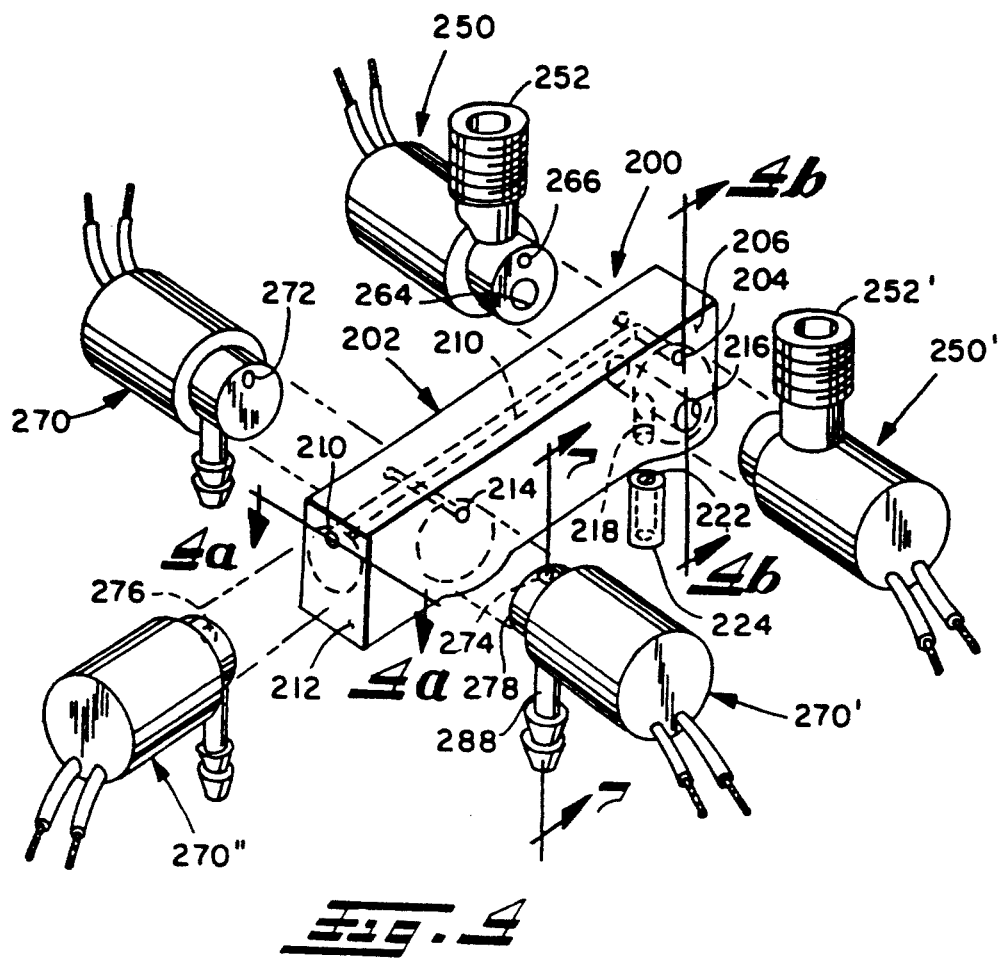
Fig. 4
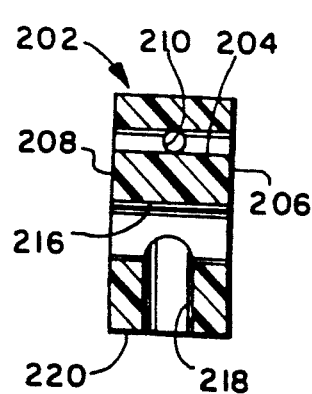
Fig. 4a
Fig. 4b

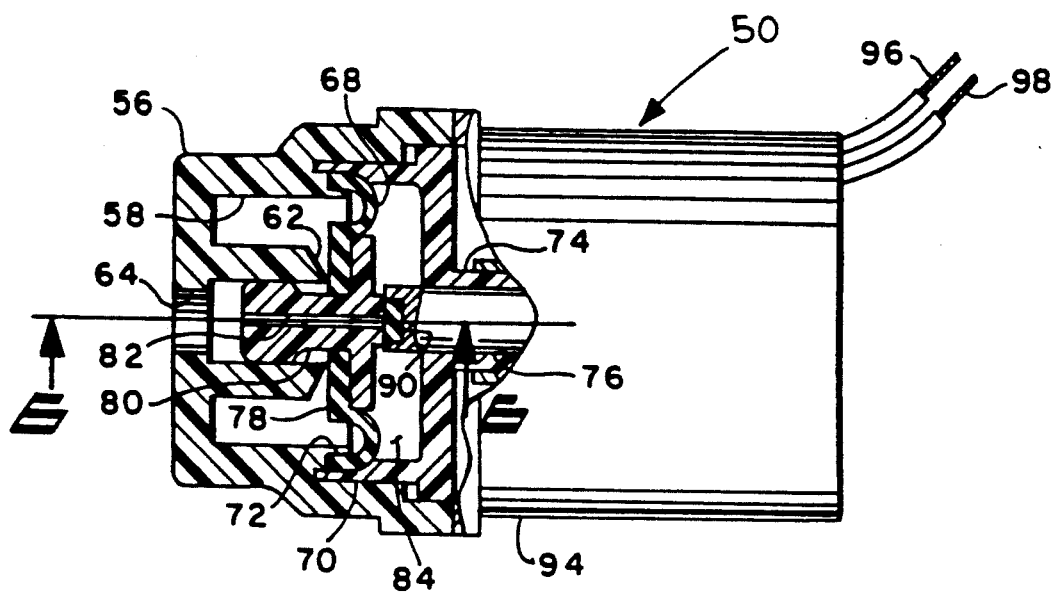
Fig. 5
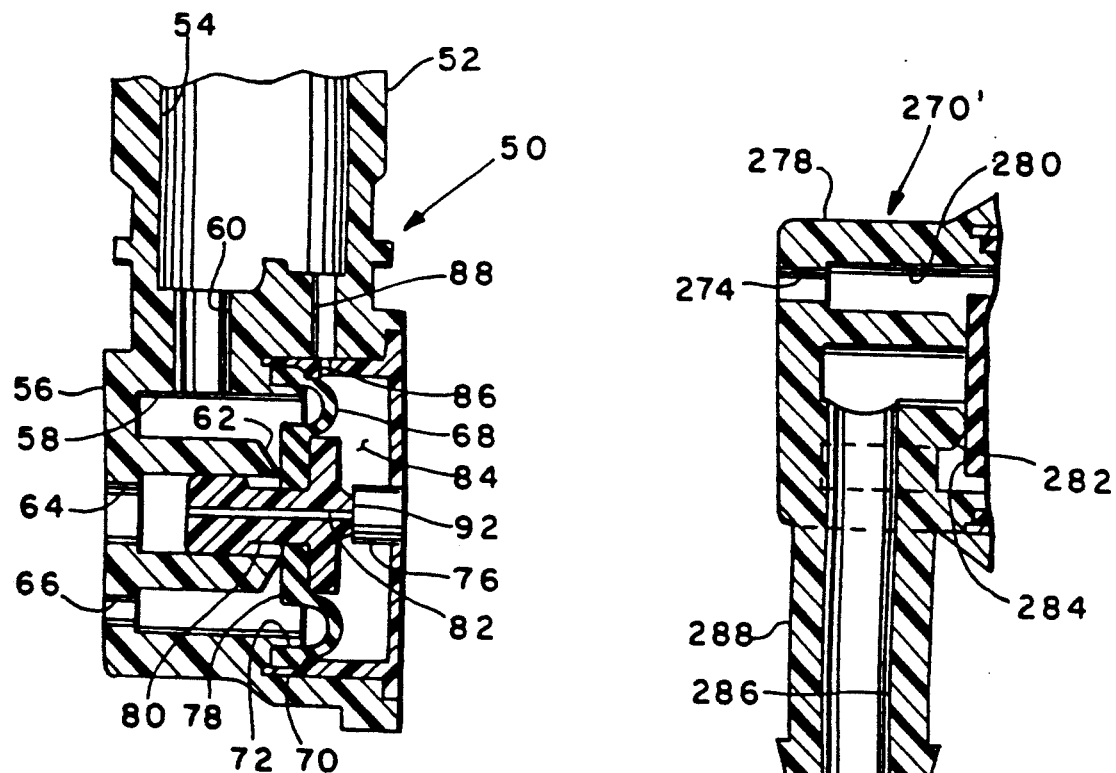
Fig. 6
Fig. 7

MODULAR VALVE ASSEMBLY

This application is a division, of application Ser. No. 938,191, filed Aug. 31, 1992, now abandoned.

BACKGROUND OF THE INVENTION

The present invention relates to electrically operated valves, and particularly those of the type employed for water inlet control to appliances such as clothes washing machines and dishwashers. Appliance water inlet valves for such applications typically employ a solenoid operating a pilot valve/armature which allows discharge from a pilot chamber creating a pressure differential across a main valve member where the pressure forces open the main valve, thus reducing the operating force requirements of the solenoid.

Solenoid operated appliance water inlet valves are typically manufactured with individual solenoids controlling flow from separate inlets adapted for connection to separate sources such as hot and cold water from the household plumbing; and, hot, cold, or mixed flow is provided by energizing either or both of the solenoids to control flow from separate valving chambers having their outlets connected to a common discharge.

However, in certain appliance applications it is desired to provide additional additives to the flow stream discharging from the common mixing valve outlet to provide, as for example, addition of bleach, detergent, or fabric softener at desired times during the machine program for elected treatment of the fluid in which the articles to be cleansed are being washed. Where it is desired to provide such additives to the wash water as it enters the appliance, it has been necessary to provide individual valves for controlling the dispensing of the desired additive into the water inlet stream; and, this has resulted in problems in providing mounting of the individual valves and additional expensive wiring to connect the valve solenoids to the appliance programmer. Furthermore, it has required a multiplicity of individual valves to supply the mixed inlet water to individual distributing valves for controlling the desired additives. Adding a multiplicity of solenoid operated valves to the washing machine in the vicinity of the flow director for the tub has proved to be cumbersome and difficult to achieve in mass production. It has thus been desired to find a way or means of minimizing the number of valves required in washing appliances to provide control of the desired plural additive dispensing functions and further to reduce the amount of fluid conduit interconnections between the mixing valves and the individual distributing valves.

SUMMARY OF THE INVENTION

The present invention provides a solenoid operated valve assembly having a plurality of individual valving operators attached by non-metallic weldment to a manifold having a plurality of inlets and outlets. A first and a second solenoid operator is provided, each adapted for connection to separate fluid sources such as a hot and cold water supply, and individually valve water to manifold passages connected to a common outlet for discharge of mixed flow. Separate auxiliary ports in the first and second valve operator valving chambers connect to auxiliary passages in the manifold to provide unvalved fluid supply thereto. Other individual valving operators are attached to the manifold by non-metallic weldment to receive flow from the auxiliary passages to their valving chambers and to control discharge flow to separate manifold outlets for providing water flow for the desired auxiliary function, such as additive dispensing connected to the individual outlet. In one embodiment, the valve assembly includes the first and second source supplied solenoids connected to opposite sides of the manifold with a third valving operator connected to the auxiliary passages for controlling flow from the first and second sources to a third auxiliary manifold outlet which may be connected to supply separate valve assemblies. In a second arrangement, the manifold includes valving operators for the individual auxiliary functions as attached to a common structure with the first and second valving operators.

BRIEF DESCRIPTION OF THE DRAWINGS

FIG. 3a is a section view taken along section indicating lines 3a—3a of FIG. 3;

FIG. 3b is a section view taken along section indicating lines 3b—3b of FIG. 3;

FIG. 3c is a section view taken along section indicating lines 3c—3c of FIG. 3;

FIG. 3d is a section view taken along section indicating lines 3d—3d of FIG. 3;

FIG. 4 is an exploded view of an alternative arrangement for a valve assembly employing five solenoid valving operators;

FIG. 4a is a section view taken along section indicating lines 4a—4a of FIG. 4;

FIG. 4b is a section view taken along section indicating lines 4b—4b of FIG. 4;

FIG. 5 is a side view of one of the valving operators of FIG. 1, with portions thereof broken away;

FIG. 6 is a portion of a section view taken along section indicating lines 6—6 of FIG. 5; and, FIG. 7 is a portion of a section view taken along section indicating lines 7—7 of FIG. 4.

DETAILED DESCRIPTION

Figure 1:
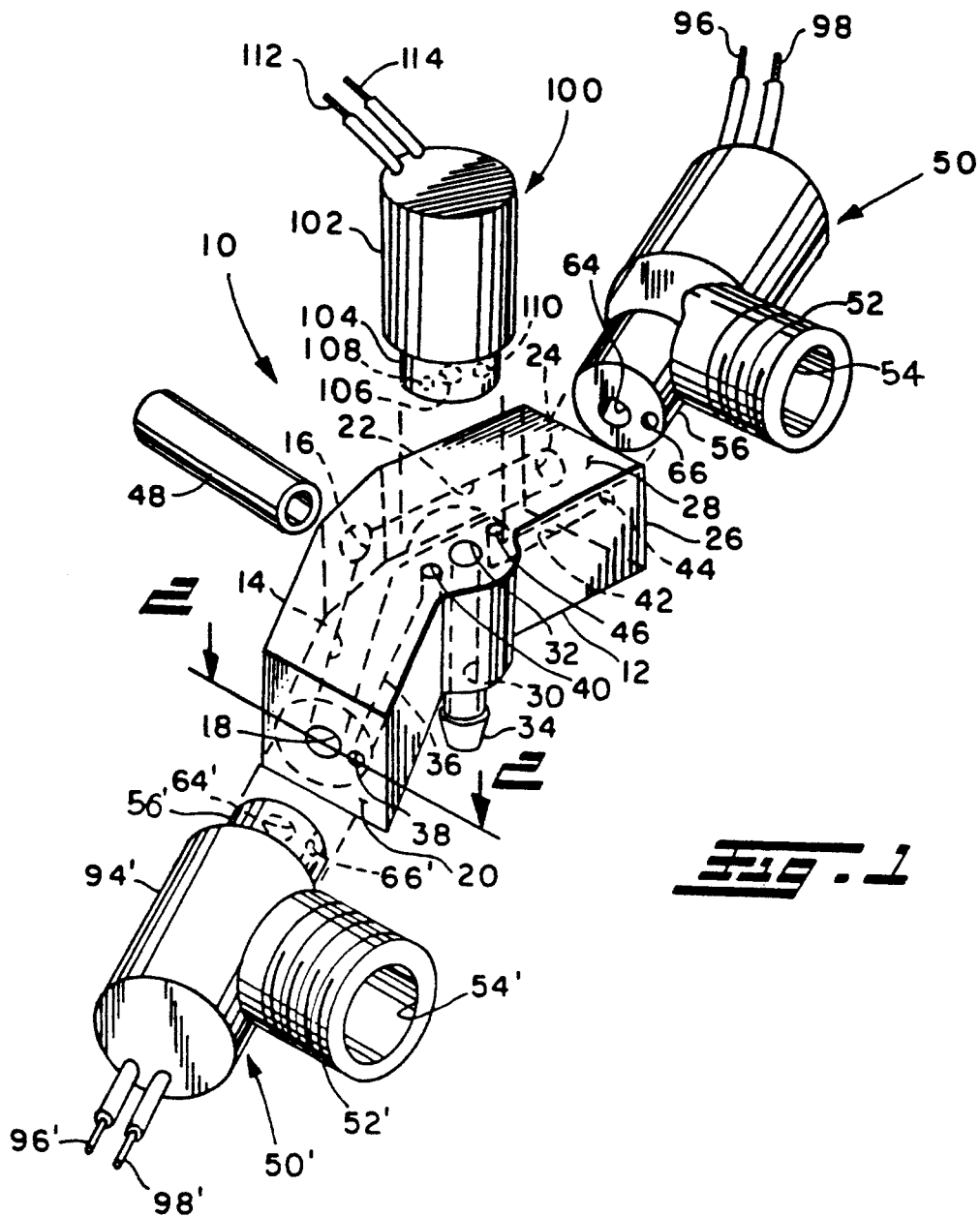
FIG. 1 is an exploded view of a first embodiment of the invention employing three solenoid valving operators.
Figure 2:
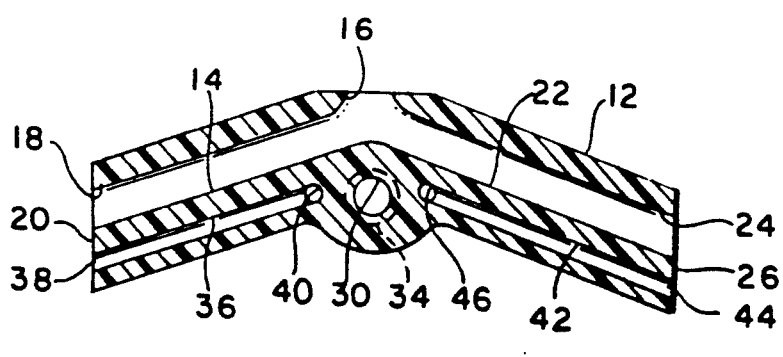
FIG. 2 is a section view taken along section indicating lines 2—2 of FIG. 1.

Referring to FIG. 1, the valve assembly is indicated generally at 10 and illustrated in the exploded state, and has a manifold block 12 preferably formed in one piece of molded thermoplastic with a generally elongated configuration rectangular in transverse section. A first inlet passage 14 is formed therein with one end communicating with common outlet port 16, and the other end of passage 14 is ported at 18 on the end face 20. A second inlet passage 22 has one end communicating with common outlet 16 and the opposite end ported at 24 on end face 26 disposed oppositely from end face 20.

A third or upper face 28 of the manifold has a passage 30 ported at 32 thereon, which passage 30 extends downwardly through the manifold block 12 and outwardly through an attachment fitting 34 extending downwardly therefrom, and which is adapted for hose attachment thereto.

Manifold block 12 has a first auxiliary passage 36 formed therein disposed generally parallel to passage 14 and which has one end thereof ported at 38 on end face 20, and the passage 36 is curved upwardly at its opposite end and ported at 40 on the upper face of the manifold with the port 40 disposed spaced adjacent port 32.

A second auxiliary passage 42 is formed in manifold block 12, and is disposed in generally space parallel relationship with passage 22; and, passage 42 has one end thereof ported at 44 on end face 26. The opposite end of passage 42 is curved upwardly and ported at 46 on the upper face of the manifold block with port 46 disposed spaced closely adjacent port 32.

Referring to FIG. 1, a discharge director or tube 48 is attached at one end thereof over the common outlet port 16 by non-metallic weldment; and, in the present practice the tube 48 is formed of similar thermoplastic as the block 12.

Referring to FIGS. 1, 5, and 6, an electromagnetically actuated valving operator, indicated generally at 50 has an inlet fitting 52 threaded for convenient attachment of a hose fitting thereto, and with an inlet passage 54 therein.

Valving operator 50 has a body 56 formed of thermoplastic similar to the material employed for the manifold 12; and, preferably, fitting 52 is formed integrally with the body 56. Body 56 has formed therein an annular chamber 58 which has an inlet passage 60 provided therein which communicates with the passage 54. An annular valve seat 62 is provided in chamber 58 and the valve seat 62 communicates with an outlet passage 64 provided in the body 56.

Referring to FIG. 6, an auxiliary passage 66 is provided through the wall of the body 56 and communicates with the valving chamber 58.

A flexible elastomeric diaphragm 68 has the outer periphery thereof sealed about the annular valving chamber 58 by a generally cylindrical tubular guide member 70 which seals a peripheral bead 72 formed on the diaphragm.

Referring to FIGS. 5 and 6, the guide member 70 has a reduced diameter portion thereof comprising a closed end cylinder 74 which has slidably received therein a ferromagnetic armature 76. Diaphragm 68 has the central portion thereof thickened to provide a movable valve member 78 which has a rigid insert 80 received centrally therethrough with a pilot flow passage 82 formed through the insert. The diaphragm thus closes the valving chamber 58 when seated on valve seat 62 and forms, in association with the guide member 70, a pilot chamber 84 which is supplied with fluid from the inlet 54 through a small bleed orifice 86 which communicates with passage 88, which is open to the inlet passage 54. If desired, passage 88 may be provided with an inlet filter screen or device (not shown) to prevent blockage of the bleed orifice 86 in any convenient manner well known in the art.

Although the bleed orifice 86 has been shown as provided remotely through the guide 70, it will be understood that alternatively, the bleed orifice may be provided through the diaphragm 68 or valve member 78 in a manner well known in the art of pilot operated valves.

Referring to FIGS. 5 and 6, armature 76 has a pilot valve member in the form of an elastomeric pad 90 retained on the end thereof, which seats against a pilot valve seat 92 formed on the insert 80 about the end of the pilot valve passage 82, which is exposed in the chamber 84.

An solenoid coil (not shown) is housed within the casing 94 and, upon energization through leads 96,98, the coil effects movement of the armature 76 rightwardly with respect to FIG. 5 to move the valve member 90 away from the pilot seat 92 to permit flow from chamber 84 through pilot passage 82, thereby creating a pressure differential, which results in movement of the main valve member 78 from the valve seat 62. Although a pilot-operated valving mechanism has been illustrated, it will be understood that alternatively the solenoid actuator 50 may be of the direct acting type well known in the art to move the main valve, if such a construction is desired.

Referring to FIG. 1, valving operator 50 is attached to end 26 on the manifold 12 such that the outlet port 64 communicates with the inlet port 24 in the manifold. The auxiliary port 66 in valve body 56 is aligned with port 44 on the end face of the manifold; and, the body 56 is secured thereto by weldment such as, for example, ultrasonic or mechanical vibration weldment.

A second valving operator 50', identical to the operator 50, is provided over the opposite end face 20 of the manifold; and, the outlet port 64' of operator 50' is aligned with the manifold inlet port 18. The auxiliary port 66' of operator 50' is aligned with manifold port 38 and the body 56 secured thereto by suitable non-metallic weldment.

Valving operator 50' has a threaded inlet fitting 52' with inlet passage 54' therein; and, the fitting 52' is adapted for hose connection thereto. Valving operator 50' contains a solenoid coil (not shown) housed in the casing 94' and the solenoid is energized through leads 96',98' extending outwardly from the casing.

Referring to FIG. 1, a third valving operator indicated generally at 100 is provided with a non-metallic valve body 104 attached to the casing 102, preferably by non-metallic weldment; and, the body 104 defines a valving chamber (not shown) which has a valved main outlet 106 and two auxiliary ports 108,110 formed therein. The internal operating components of the valving operator 100 are functionally identical to those shown in FIGS. 5 and 6 with respect to the valving operator 50. In operation, the ports 108,110 serve as the inlets to the valving chamber for the valving operator 100. The body 104 of valving operator 100 is secured to the upper surface 28 of the manifold 12 by non-metallic weldment with the outlet port 106 aligned with the inlet port 32 in the manifold; and ports 108,110 are aligned respectively with the ports 40,46 in the manifold.

In operation, with hot and cold water lines connected to either of the inlet fittings 52,52' of the valving operators 50,50', water pressure is applied through unvalved ports 66,44 to passage 42, and through ports 46,110 to the valving chamber of operator 100. Similarly, water pressure is applied through ports 66',38, and through passage 36, and through ports 40,108 to the valving chamber of operator 100.

Upon energization of either or both of the valving operators 50,50', water flows through the outlets 64,64' to passages 14,22 to the outlet port 16 and through discharge tube 48 for the desired water fill of an appliance washing receptacle.

Upon energization of valving operator 100 by application of power through its power leads 112,114, mixed water flow from the sources attached to fittings 52,52' is discharged through the outlet port 106 of valve body 104, and through port 32 of the manifold and passage 30 thereof, and externally through the fitting 34 for an auxiliary function.

Referring to FIGS. 3, 3a, 3b, 3c, and 3d, another embodiment of the invention is indicated generally at 120 and has a manifold indicated generally at 122, comprising an input section block 124, and an auxiliary outlet section block 126 having a generally elongated configuration with a rectangular transfer section.

Referring to FIGS. 3a and 3b, manifold block 124 has an inlet passage 128 provided longitudinally therein, which is ported on the right hand end face 130 of the block 124. The longitudinal passage 128 has vertically disposed supply passages 132,134 communicating therewith at longitudinally spaced stations along the block 124. Supply passages 132,134 are ported on the upper face 136 of the block.

Figure 3:
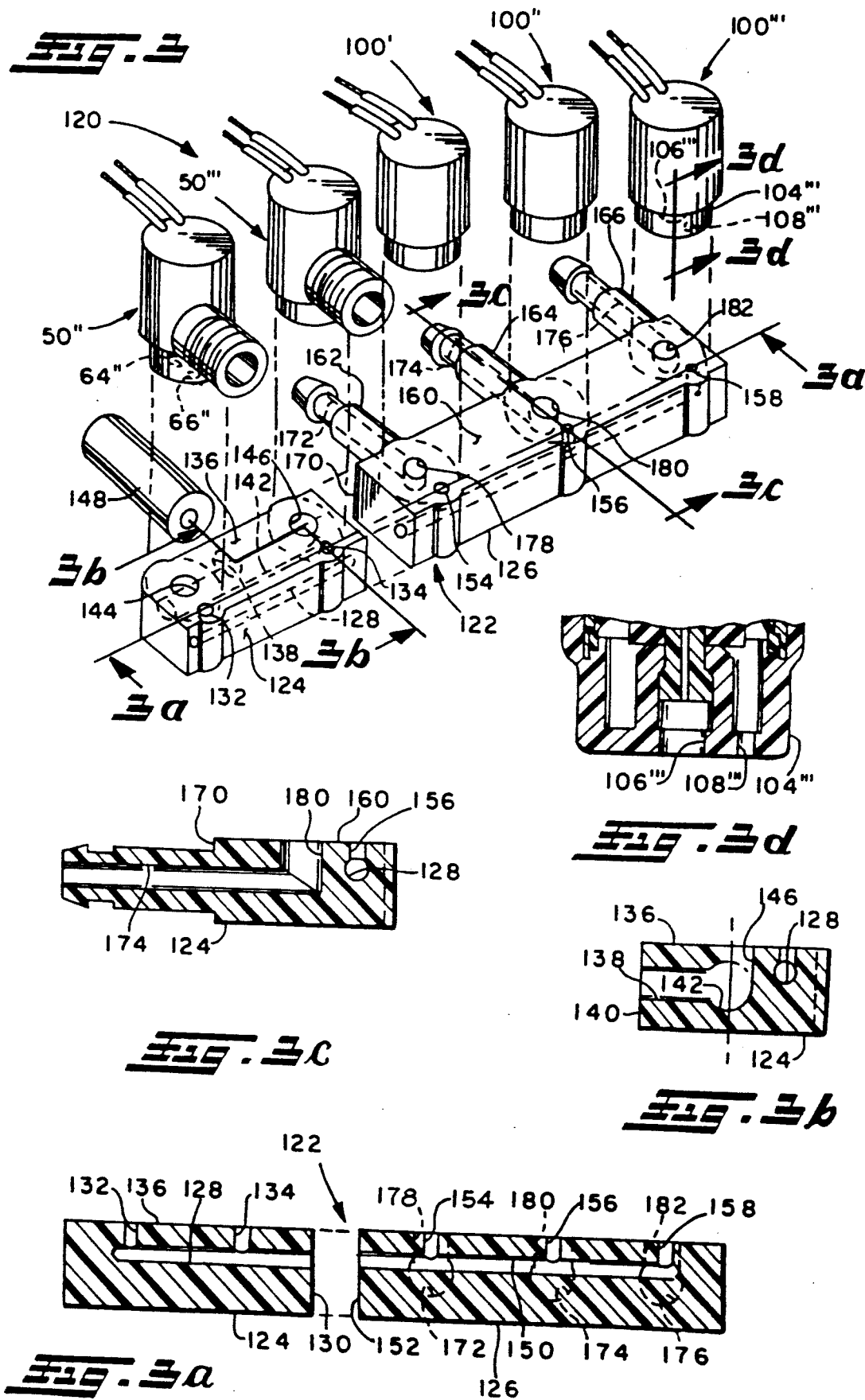
FIG. 3 is an exploded view of a second embodiment employing five solenoid valving operators attached to a common manifold structure.

Referring to FIGS. 3 and 3b, manifold block 124 has an outlet passage 138 formed transversely therein and ported to the rearward side face 140 of the block. Passage 138 communicates with second longitudinal mixing passage 142 provided in the block 124 in spaced parallel relationship to passage 128, which mixing passage 142 is ported vertically to the upper face 136 of the block at the same station as the passages 132,134, as denoted by reference numerals 144,146 in FIGS. 3 and 3b. An outlet or discharge tube 148 is secured over the common outlet 138 by a suitable expedient which in the present practice comprises non-metallic weldment.

Referring to FIGS. 3, 3a, and 3c, the outlet portion of the manifold 126 has a longitudinal passage 150 formed therein, which is ported on end face 152 thereof; and, passage 150 is disposed aligned with passage 128 in the manifold block 124. It will be understood that blocks 126 and 124 are joined at their end faces 130,152 by non-metallic weldment to form a manifold assembly such that passage 128 and passage 150 are in open communication through the weld joint.

The manifold auxiliary outlet section block 126 has three vertically disposed longitudinally spaced passages 154,156,158 provided therealong, each of which communicates with the passage 128 and each of which is ported on the upper surface 160 of the block 126.

At each of the longitudinal stations corresponding to the passages 154,156,158 an outlet fitting indicated respectively by reference numerals 162,164,166, is provided and extends from the side surface 170 of the manifold block 126, each of which has an outlet passage denoted respectively 172,174,176 formed therein and each of which communicates with a vertical riser passage in the block 126 as denoted respectively by reference numerals 178,180,182. Passages 178, 180 182 are disposed longitudinally spaced and respectively at the same stations as the passages 154,156,158. The riser passages 178,180,182 are each ported to the upper surface 160 of the manifold block 126.

Referring to FIG. 3 and 3d, inlet/outlet port stations 132,144, and 134,146 on the block 124 of the manifold 122 have respectively a valving operator 50",50'" respectively disposed thereover and secured thereto by non-metallic weldment. It will be understood that the valving operators 50" and 50'" are identical to the operators 50,50' of the embodiment of FIG. 1. Thus, valving operator 50" has its inlet 66" disposed in communication with passage 132 and its outlet port 64" disposed for communication with outlet passage 144. Valving operator 50'" has its inlets and outlets similarly disposed with respect to passages 134 and 146.

A plurality of valving operators 100', 100", 100'" are disposed longitudinally spaced along the top surface 160 of the block 126 of manifold 122, respectively at the same longitudinal stations as the inlet/outlet passage pairs 154,178, and 156,180, and 158,182, and the operators secured thereto by non-metallic weldment. Each of the valving operators 100',100",100'" is generally similar to valving operator 100 in FIG. 1, except that only one inlet passage is provided as shown typically for valving operator 100'" in FIG. 3d, and as denoted by reference numeral 108'". The outlet passage 106'", of valving operator 100'" is disposed to communicate with passage 182 to permit flow from the passage 150 to the outlet passages 182 and 176 upon energization of valving operator 100'".

It will be understood that the valving operators 100', 100" are similarly disposed for controlling flow between passages 154,178, and 156,180 upon individual energization and de-energization.

Referring to FIG. 4, 4a, and 4b, another embodiment of the invention is indicated generally at 200 and has a one-piece manifold block indicated generally at 202 which has an inlet passage 204 extending transversely therethrough open to the opposite sides 206, 208. The passage 204 intersects a longitudinal passage 210, which extends to the left end face 212 and is open thereto. A second transversely extending passage 214 extends from the lower block face 206 to the upper face 208 of the block, and is spaced longitudinally from passage 204 and also intersects the passage 210 as shown in detail in FIG. 4a.

An outlet passage 216 extends transversely through the block 202 from the front face 206 to the rear face 208. It will be understood that the transverse outlet passage 216 is disposed at the same longitudinal station as passage 204 and is located directly below passage 204 in spaced parallel arrangement. The passage 216 intersects a downwardly-extending outlet passage 218 which is ported to the lower face 220 of block 202. Outlet passage 218 has in communication therewith the interior passage 222 of a discharge tube 224, which is attached at one end thereof to the bottom surface 220 of the manifold 202 preferably by non-metallic weldment.

Referring particularly to FIG. 4, valving operators 250,250' are disposed respectively on the opposite faces 208,206 of the manifold 202 and secured thereto by non-metallic weldment. The valving operators 250,250' are identical to the operators 50,50' of the FIG. 1 embodiment. The valving operator 250 has its inlet 266 aligned with the end of passage 204 on the rear face 208 of the manifold 202 and its switching passage 264 aligned with the same end of passage 216. It will be understood that the inlet of operator 250' is aligned with the end of passage 204 on the face 206 of the manifold 202; and, the auxiliary passage of valving operator 250' is aligned with passage 204 with the outlet thereof aligned with the same end of passage 216. Thus, the inlet passage 204 may be supplied from either the valving operator 250, valving operator 250', or both. It will be understood that valving operator 250 has its inlet fitting 252 adapted to be connected to one source of fluid; and, the inlet 252' of valving operator 250 adapted to be connected to a separate fluid supply.

A second plurality of valving operators, indicated generally at 270,270',270" are disposed one on each opposite side face respectively 208,206, and the end face 212 of manifold 202. The valving operator 270 is shown with its inlet 272 as positioned over the end of passage 214 on manifold face 208. In like manner, valving operator 270' has its inlet 274 disposed in communication with the end of passage 214 on manifold face 206; and, the inlet 276 of valving operator 270" is disposed for communication with the end of passage 210 on the valve face 212. It will be understood that each of the valving operators 270,270′,270″ has its face or body secured to the manifold 202 by non-metallic weldment.

Referring to FIGS. 4 and 7, valving operator 270′ has its body or base 278 formed with an annular valving chamber 280 with inlet 274, which supplies the annular chamber 280 and a valve seat 282 provided in the chamber 280. A movable valve member 284 is disposed for movement with respect to valve seat 282 for controlling flow to an outlet passage 286 formed in an outlet fitting 288. The outlet fitting 288 is adapted for connection to a hose for providing an appliance function such as bleach, detergent, or other additive or conditioner for the washing operation. It will be understood that valving operators 270 and 270″ are identical to the construction illustrated in FIG. 7 for the valving 270′.

In operation, with either of the valve inlets 252,252′ of the valving operators 250,250′ connected to a source of fluid supply, the passage 204,210 is filled with fluid and the inlets to valving operators 270,270′, and 270″ are charged. Thus, upon energization of any of the valving operators 270,270′,270″, fluid may be discharged through the outlet thereof, irrespective of whether valving operators 250 or 250′ are energized to supply outlet 224.

The present invention thus provides an easily manufactured valve assembly for providing mixed flow from plural sources to a main outlet and individually valved auxiliary outlets with the individual electrically operated valving operators conveniently mounted on a manifold capable of being molded of thermosetting plastic material, and the valving operators secured thereto by non-metallic weldment. In one embodiment, the manifold is formed of separate blocks secured together by non-metallic weldment; and, in other embodiments, the manifold is molded as a one-piece block.

Although the invention has hereinabove been described with respect to the illustrated embodiments, it will be understood that the invention is capable of modification and variation, and is limited only by the following claims.

I claim:
1. A method of making a valve comprising:
    (a) providing a manifold formed of non-metallic material having a plurality of inlets communicating with an outlet and an auxiliary passage therethrough;
    (b) providing a plurality of valves operators, each having a non-metallic body with an inlet, outlet, and an electro-motor operable for controlling flow between said inlet and outlet;
    (c) positioning one of said operators on said manifold with the outlet thereof communicating with one of said manifold inlets and the inlet thereof communicating with said auxiliary passage and securing and sealing said operator to said manifold by non-metallic weldment.

2. The method defined in claim 1, wherein said step of providing a manifold includes the steps of providing a non-metallic flow director and securing and sealing same by non-metallic weldment to the outlet of said manifold.

3. A method of making a valve comprising:
    (a) forming a manifold of non-metallic material with plural inlets communicating with a common outlet and with an auxiliary passage;
    (b) providing a plurality of identical inlet valve operators, each with an inlet and a valved outlet and electromotor for controlling flow between its inlet and valved outlet;
    (c) forming an unvalved outlet in each of said operators continuously communicating with the operator inlet;
    (d) positioning each of said plurality of inlet operators on said manifold with the operator valved outlet communicating with one of the manifold inlets and the operator unvalved inlet communicating with said auxiliary passage and securing and sealing each of said inlet valve operators to the manifold by non-metallic weldment;
    (e) providing an outlet valve operator with an inlet and a valved outlet; and,
    (f) positioning said outlet operator on said manifold with the inlet of said outlet operator communicating with said auxiliary passage and securing and sealing said outlet operator on the manifold by non-metallic weldment.

4. The method defined in claim 3, wherein said step of positioning each of said inlet valve operators includes positioning said inlet operators with the inlets thereof in spaced parallel arrangement.

5. The method defined in claim 3, wherein said step of forming said manifold includes forming a first block with said plural inlets and common outlet and an auxiliary passage and forming a second block having an auxiliary passage and an auxiliary outlet; and, positioning said first and second blocks to communicate the auxiliary passages of one with the other and securing and sealing said blocks together by non-metallic weldment.

6. The method defined in claim 3, wherein said step of forming said manifold includes forming an auxiliary outlet passage; and, said step of positioning said outlet operator includes communicating the valved outlet of said outlet operator with said auxiliary outlet passage.

7. The method defined in claim 3, wherein said step of forming said manifold includes providing a discharge director and securing and sealing said director over said common outlet by non-metallic weldment.

* * * * *